(Model.)

C. F. BEATTY.
HAT BAND.

No. 274,704.   Patented Mar. 27, 1883.

WITNESSES:
Isaac Simonson
Daniel Sickels

INVENTOR
Claudius F. Beatty,
BY E. R. Brown,
ATTORNEY

UNITED STATES PATENT OFFICE.

CLAUDIUS F. BEATTY, OF BROOKLYN, NEW YORK.

HAT-BAND.

SPECIFICATION forming part of Letters Patent No. 274,704, dated March 27, 1883.

Application filed November 16, 1882. (Model.)

*To all whom it may concern:*

Be it known that I, CLAUDIUS F. BEATTY, a citizen of the United States, residing in Brooklyn, in the county of Kings and State of New York, have invented certain new and useful Improvements in Hat-Bands, of which the following is a specification.

My invention relates to the manufacture of bands for hats and caps and other articles of wearing-apparel. Heretofore such bands have been made of ribbon or other fabric which is woven with a selvage.

The invention consists essentially in combining a gutta-percha or rubber tissue or similar substance with a fibrous, woven, or other fabric, or with leather or other material, whereby an article is produced which possesses all the advantages of a fabric woven with a selvage.
In carrying out my invention I employ any suitable fibrous, textile, or woven fabric, or leather, or any suitable material from which hat or cap bands may be made, together with the substance technically known as "gutta-percha tissue" or "rubber tissue," or any other similar article of a suitable character.

The woven or other material may be of any desired dimensions, and the tissue may be made to correspond therewith. Where silk, satin, worsted, or other cloth is used, the entire width of the fabric may be employed, with the tissue of corresponding width applied thereto, and the whole afterward cut into strips; or the material and the tissue may be cut into strips of the desired width and length and applied to each other.

In forming a band the strips of tissue and of cloth or other material are caused to adhere to each other by means of heat, pressure, or otherwise, and the edges of the strips are turned inward and toward each other; or the strip is doubled, so as to bring the edges together, and the surfaces of the tissue are caused to adhere closely and uniformly, so as to form a smooth and even band. This may be accomplished by hand or machinery, or in any other suitable manner.

Figure 1:
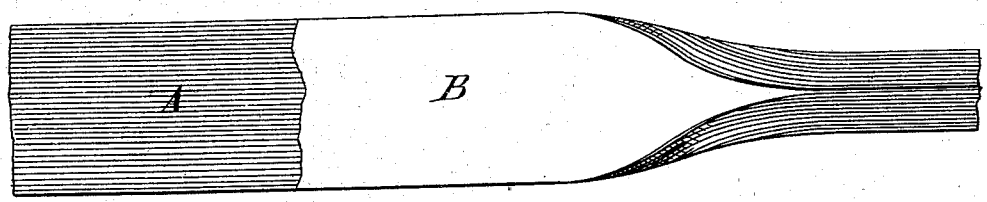
Figure 2:
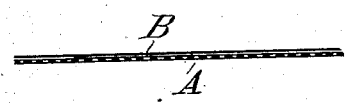
Figure 3:
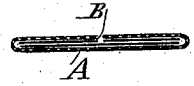
Figure 4:
Figure 5:
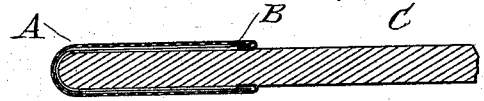

The accompanying drawings illustrate a mode of carrying out my invention.
Figure 1 is a view of the inner side of a strip of material with the tissue applied thereto. Fig. 2 is a longitudinal sectional view of the same. Figs. 3, 4, and 5 are transverse sectional views.

A represents the woven or other material forming the outside of the band, and B the rubber or gutta-percha tissue. The strip may be folded with its edges toward and joining each other at the longitudinal center on the rear or inner side, as shown in Figs. 1 and 3, or it may be doubled longitudinally, so as to bring the edges together, as shown in Fig. 4.

The invention is also applicable to bindings for the edges of hat-brims, in which case the edges of the strips are turned inward, as shown in Fig. 5, in which A represents the outer material of the band or binding, B the tissue, and C a portion of the brim to which the binding is applied. When made with the edges turned in, as described, it is also applicable for use as a band.

I am aware that in the manufacture of hats, &c., it is not new to secure tape or other previously-prepared binding in position by coating the inner side of the binding material with a plastic substance, like gutta-percha, and to attach the binding so provided to the hat by the direct application thereto of pressure and sufficient heat to melt the said coating. I do not claim any method of applying a band to a hat, my invention consisting in the manufacture of an improved hat-band from materials not previously used for that purpose, said band to be afterward applied to the hat in any well-known manner.

What I claim is—

As an improved article of manufacture, the herein-described band for hats and caps, which consists in a strip of woven fabric or similar material not provided with selvage-edges, and liable to injury from handling, in combination with a strip of gutta-percha or india-rubber, said strips being folded together so as to inclose the plastic material, and then united by heat and pressure, substantially as set forth.

CLAUDIUS F. BEATTY.

Witnesses:
E. R. BROWN,
JOS. A. LEVY.